United States Patent [19]

North

[11] Patent Number: 5,506,695
[45] Date of Patent: Apr. 9, 1996

[54] LIGHT SHUTTER APPARATUS FOR A PHOTOGRAPHIC FILM SCANNER

[75] Inventor: Stephen P. North, Rochester, N.Y.

[73] Assignee: Eastman Kodak Company, Rochester, N.Y.

[21] Appl. No.: 356,423

[22] Filed: Dec. 15, 1994

[51] Int. Cl.[6] .................................................. H04N 1/04
[52] U.S. Cl. ...................... 358/474; 358/475; 358/487; 355/71; 359/227; 359/234
[58] Field of Search ........................... 358/474, 475, 358/487, 496, 461, 505, 506, 509; 355/71, 101, 121, 27; 359/227, 234, 236; 354/230, 250; 250/229, 237 R

[56] References Cited

U.S. PATENT DOCUMENTS

| | | | |
|---|---|---|---|
| 3,774,520 | 11/1973 | Smith et al. ........................ | 95/89 R |
| 3,988,537 | 10/1976 | Cooley ................................ | 358/475 |
| 4,614,976 | 9/1986 | Ogata .................................. | 358/257 |
| 4,801,979 | 1/1989 | Bourgeois ........................... | 355/106 |
| 5,153,715 | 10/1992 | Bender et al. ...................... | 355/27 |

*Primary Examiner*—Edward L. Coles, Sr.
*Assistant Examiner*—Thomas D. Lee
*Attorney, Agent, or Firm*—Francis H. Boos, Jr.

[57] ABSTRACT

A low cost, compact light shutter apparatus for a photographic film scanner in which an elongate light shutter mechanism has a curvilinear surface nested in a mating, curvilinear recess formed in an opaque plate. The shutter mechanism preferably is comprised of an elongated blade of sufficient length and width to cover a light transmitting slot in the plate when the blade is in a light blocking position. The blade is attached to a rotary solenoid for movement between light blocking and light transmitting positions.

4 Claims, 1 Drawing Sheet

LIGHT SHUTTER APPARATUS FOR A PHOTOGRAPHIC FILM SCANNER

FIELD OF THE INVENTION

This invention relates generally to the field of photographic film scanning apparatus, and in particular to light shutter apparatus for a photographic film scanner.

BACKGROUND OF THE INVENTION

In prior art film scanners, shutter apparatus has comprised a stepper motor connected to a shaft on which a rotating shutter disc is mounted. The disc is generally provided with an opaque region and one or more openings which are rotated into alignment with a film exposure gate to alternately block and allow passage of light from a light source to the film exposure gate. Spectral or neutral density filters are incorporated in the openings for controlled exposure purposes used during calibration of the scanner. Such an arrangement is bulky and not suitable when space constraints in the film scanner require more compact designs, especially if light filtering is not required.

An alternative shutter mechanism to the rotating disc is disclosed in U.S. Pat. No. 3,774,520 for exposing microfilm. This mechanism employs a rotating partial cylinder with an elongated slot formed in the center of a half section of a cylindrical member and with an ultraviolet exposure lamp positioned at the axis of rotation of the cylindrical member. The half cylinder forms a mask or shroud around the lamp blocking light from reaching the microfilm. For exposure of the film, the mask is rotated 180° to allow light to pass through the slot as it rotates between the lamp and the film, the surrounding mask blocking the light during the initial and final stages of the 180° rotation. In this arrangement, the lamp is nested within the shutter and the mask portion can easily block the light for shuttering purposes. However, a problem with such an arrangement is that it does not completely block the light from the central light source, allowing stray light from around the mask to occur. Moreover, the disclosed arrangement would not be suitable for virtual contact scanner designs requiring a remote light source, such as is disclosed in commonly assigned U.S. Pat. No. 5,153,715, issued Oct. 6, 1992.

SUMMARY OF THE INVENTION

In accordance with the present invention, therefore, there is provided a light shutter apparatus for a photographic film scanner having a light source, a linear scanner and a film exposure gate located between the light source and linear scanner. The light shutter apparatus comprises a stationary plate positioned between the light source and the film exposure gate. The plate has an elongated, curvilinear shaped recess and a light transmitting slot, the recess and slot having parallel elongate dimensions which define a light path from the light source to the film exposure gate. The light shutter apparatus also includes a rotary drive means rotatable about an axis of rotation parallel with the elongate dimensions of the recess and slot. The apparatus further includes elongated shutter means having a curvilinear surface nested within the curvilinear recess of the plate, the surface having a length and circumferential width sufficient to prevent transmission of light through the elongated slot when in a light blocking position in the recess. The shutter means is coupled to the rotary drive means for rotation about said axis of rotation between light blocking and light passing positions.

DETAILED DESCRIPTION OF THE INVENTION

Figure 1:
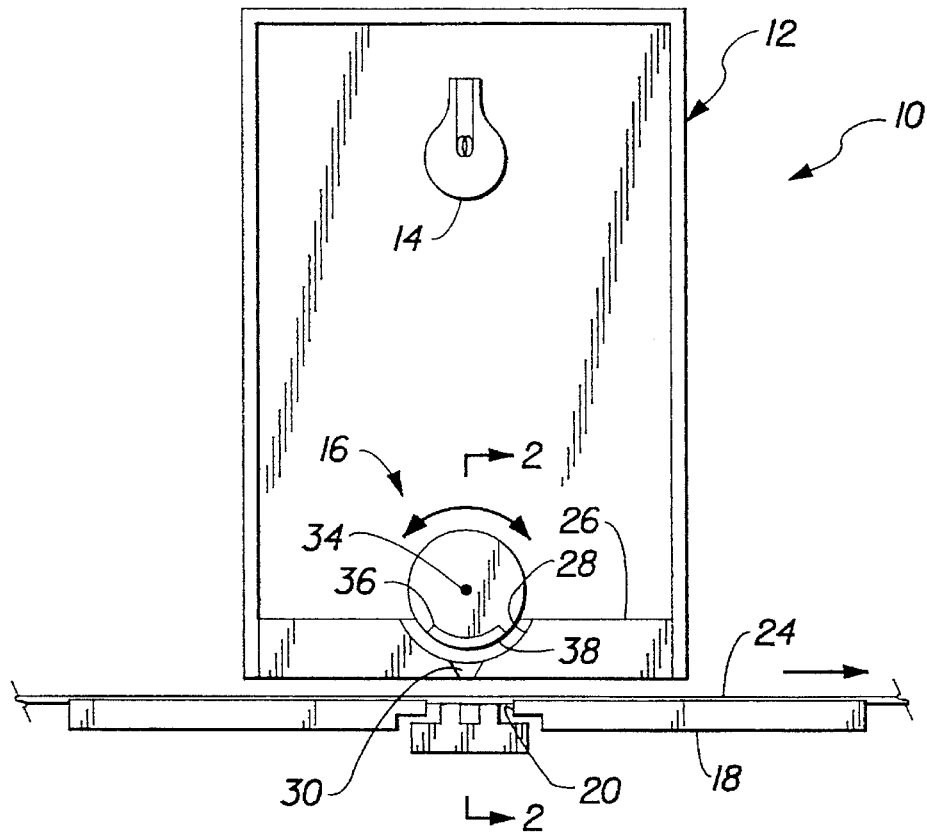
FIG. 1 is an elevation view of a film scanner showing the light shutter apparatus of the present invention in a light blocking position.
Figure 2:
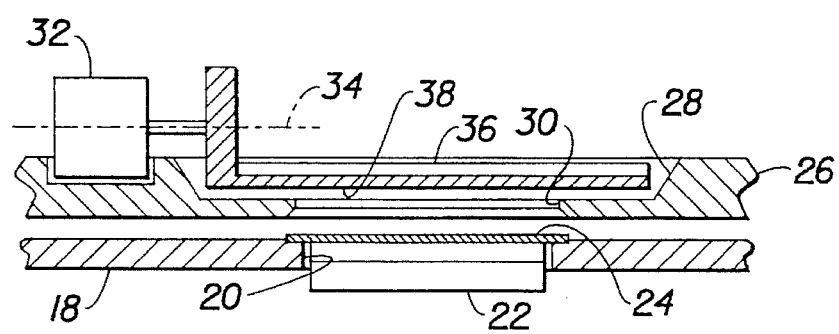
FIG. 2 is a side section view of the light shutter apparatus of FIG. 1.

Referring jointly to FIGS. 1 and 2, the light shutter apparatus of the invention is incorporated in a photographic film scanner 10 which is comprised of a lighthouse 12 having a light source 14 at the upper end remotely positioned from the light shutter apparatus 16 of the invention at the bottom end of the light house 12. A film track 18 has an exposure gate 20 in which a linear CCD scanner 22 is positioned so as to be in virtual contact with film strip 24 as it passes across the gate 20. The light shutter apparatus 16, according to the invention, is comprised of a stationary, opaque plate 26 positioned between the light source 14 and the film exposure gate 20. The plate 26 is provided with an elongated, curvilinear shaped recess 28 and a light transmitting slot 30. Both the recess and slot have elongate dimensions in parallel and define a light path through the plate 26 to allow light to be transmitted to the CCD scanner 22.

The light transmitting shutter includes a rotary drive means, preferably a rotary solenoid 32, which is rotatable about an axis of rotation 34 in parallel with the elongate dimension of the recess and slot. An elongated shutter means, preferably in the form of a thin elongated blade 36, has a curvilinear surface 38 nested within the curvilinear recess 28 of the plate 26. The length and circumferential width of the blade 36 is such as to prevent light from passing through the elongated slot 30 when in a light blocking position, as shown in FIG. 1. For this purpose the curvilinear blade extends beyond the opening of the slot by an amount sufficient to form a light baffle attenuating the light to an appropriately low, i.e. dark, level as viewed through the slot 30 from the underside of plate 26. The blade is coupled to a disc-shaped support which, in turn, is connected to the drive shaft of rotary solenoid.

Figure 3:
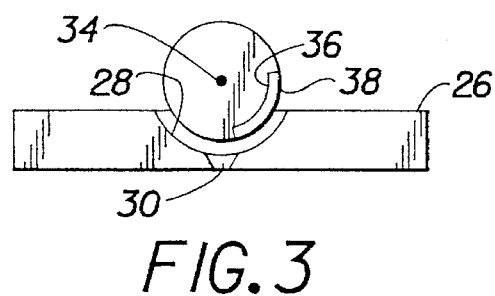
FIG. 3 is a partial segment of the FIG. 1 view showing the light shutter apparatus rotated out of the light blocking position.

In operation, when film strip 24 is being scanned, the shutter blade is rotated by solenoid 32 to an open position, as shown in FIG. 3, and held there for the duration of the film scanning process. Before commencement of the film scanning, and/or at periodic times during the film scanning process, it is necessary to perform calibration of the scanner. When this occurs, the rotary solenoid is activated to rotate the blade into a light-blocking position over the slot during the time at which the CCD sensor 20 is tested for dark level output. The shutter is then rotated to the open position shown in FIG. 3 and the CCD sensor is tested for maximum level output. Using the calibration process described in copending, commonly assigned U.S. application Ser. No. 08/298,877, the scanner can be fully calibrated from just the two light levels of exposure taken with the shutter in the fully open (maximum light) and in the fully closed (dark or no light) positions.

The invention has been described with reference to a preferred embodiment. However, it will be appreciated that variations and modifications can be effected by a person of ordinary skill in the art without departing from the scope of the invention.

| PARTS LISTS | |
|---|---|
| 10 | film scanner |
| 12 | lighthouse |
| 14 | light source |
| 16 | light shutter apparatus |
| 18 | film tracks |
| 20 | film exposure gate |
| 22 | linear CCD scanner |
| 24 | film strip |
| 26 | opaque plate |
| 28 | shutter recess |
| 30 | light transmitting slot |
| 32 | rotary drive solenoid |
| 34 | shutter axis of rotation |
| 36 | shutter blade |
| 38 | shutter blade curvilinear surface |

What is claimed is:

1. Light shutter apparatus for a photographic film scanner having a light source, a linear scanner and a film exposure gate located between the light source and linear scanner, the shutter mechanism comprising;

a stationary plate positioned between the light source and the film exposure gate, the plate having an elongated, curvilinear shaped recess and a light transmitting slot, the recess and slot having parallel elongate dimensions and defining a light path from the light source to the film exposure gate;

a rotary drive means rotatable about an axis of rotation parallel with the elongate dimensions of the recess and slot; and elongated shutter means having a curvilinear surface nested within the curvilinear recess of the plate, said recess and shutter means being cylindrically shaded in complementary mating manner, the shutter means surface having a length and circumferential width sufficient to prevent light from passing through the elongated slot when in a light blocking position in the recess, the shutter means being coupled to the rotary drive means for rotation about said axis of rotation between light blocking and light passing positions.

2. Light shutter apparatus of claim 1 wherein said shutter means comprises an elongated blade curvilinear about the axis of rotation coupled at one end to a circular disc which, in turn, is connected to the rotary drive means.

3. Light shutter apparatus of claim 1 wherein said rotary drive means comprises a rotary solenoid.

4. Light shutter apparatus of claim 1 wherein said light shutter means is adjacent said film in the exposure gate and said light source is remote from the light shutter means.

* * * * *

UNITED STATES PATENT AND TRADEMARK OFFICE
CERTIFICATE OF CORRECTION

PATENT NO. : 5,506,695
DATED : April 9, 1996
INVENTOR(S) : Stephen P. North

It is certified that error appears in the above-indentified patent and that said Letters Patent is hereby corrected as shown below:

Col. 4, line 9               "shaded" should read --shaped--

Signed and Sealed this

Twenty-third Day of July, 1996

*Attest:*

BRUCE LEHMAN

*Attesting Officer*       *Commissioner of Patents and Trademarks*